United States Patent [19]

Overholser

[11] Patent Number: 4,947,175
[45] Date of Patent: Aug. 7, 1990

[54] RADAR RANGE

[75] Inventor: Denys D. Overholser, Roswell, N. Mex.

[73] Assignee: Lockheed Corporation, Calabasas, Calif.

[21] Appl. No.: 565,325

[22] Filed: Dec. 27, 1983

[51] Int. Cl.$^5$ .............................................. G01S 7/40
[52] U.S. Cl. ......................................... 342/165; 342/4
[58] Field of Search ................... 343/17.7, 18 A, 18 B; 342/1, 165, 169, 173, 5, 4, 166

[56] References Cited

U.S. PATENT DOCUMENTS

| 2,622,242 | 12/1952 | Freedman et al. | 343/18 B |
| 2,763,001 | 9/1956 | Bussey | 343/18 A |
| 3,495,265 | 2/1970 | Smith | 343/18 A |
| 3,982,249 | 9/1976 | Toman | 343/412 X |
| 4,184,155 | 1/1980 | Silvertson, Jr. | 343/18 B X |
| 4,651,160 | 3/1987 | Bornkast et al. | 343/719 |

Primary Examiner—Thomas H. Tarcza
Assistant Examiner—John B. Sotomayor
Attorney, Agent, or Firm—Frederic P. Smith

[57] ABSTRACT

An improved radar range comprising a ground plane (22), support means (28) for supporting a target (26) a selected height above the ground plane, transmitting means (24) for directing for a selected period of time an electromagnetic wave at the target, means (30, 32) for increasing the time required for the portion of the electromagnetic wave reflected off the target toward the ground plane to return to the target, and receiving means (24) for receiving for a selected period of time the portion of the electromagnetic wave that is backscattered by the target. In a particular embodiment, the means for increasing the return time includes means for recessing the support means a selected distance below the ground plane by providing a diffraction ridge (30) a selected distance from the support means toward the transmitting means with the ridge sloping down to the selected distance below the ground plane.

12 Claims, 2 Drawing Sheets

RADAR RANGE

TECHNICAL FIELD

The invention relates to the field of radar cross-section measurement apparatus and, in particular, to an improved radar range for measuring the radar cross-section of a target.

BACKGROUND ART

For the past forty years anechoic chambers and ground plane ranges have been used to measure radar scattering from targets in order to measure the radar cross-section of such targets. The ground plane range has been successfully employed to measure large targets at close-to-far field conditions. In the ground plane range, a transmitter/receiver antenna is used to beam an electromagnetic wave at a target supported by a pylon and to measure the backscattered radiation to determine the radar cross-section.

The ground plane range utilizes the earth as a reflecting plane to increase antenna gain in the vicinity of the target. This provides an overall 12db signal to noise improvement for isotropic antennas over a perfect reflecting plane. This feature while improving gain restricts the region of uniform amplitude in the vertical plane due to the interaction of the phase of the direct ray-wave path and the reflected ray-wave path. The region of uniform amplitude increases as the target is raised and the antenna is lowered and decreases as the target is lowered and the antenna is raised. The latter situation is often preferred, however, since raising the antenna allows the antenna to be raised above the ground plane (below which a portion of the antenna has often had to be recessed in a pit), and the use of a larger antenna to provide more power on the target.

In the latter situation, however, the target has to be lowered thereby allowing radiation which has scattered to the ground plane and reflected back to the target to be backscattered from the target to the receiving antenna causing a false signal reading. This radiation is often referred to as two-way ground clutter while radiation that has scattered to the ground plane and reflected to the antenna is often referred to as one-way ground clutter. While this backscattered radiation can be gated out if the target is raised sufficiently above the ground plane, such an increase in height would necessitate the transmitting antenna to be lowered, thus made smaller and recessed into the ground plane, would broaden and lose power on the transmitting beam, and would cause additional unwanted backscatter from the higher and larger pylon structure needed to raise the target further above the ground plane.

Accordingly, it is a general object of the present invention to provide an improved radar range.

It is another object of the present invention to provide a radar range which permits the use of larger and higher transmitting antennas.

It is a further object of the present invention to provide a radar range which has decreased backscatter from the supporting structure for a radar target.

It is still another object of the present invention to provide a radar range which permits a sharper and more powerful radar beam to be directed on a target.

It is still another object of the present invention to provide a radar range in which the target can be lowered without introducing spurious backscattered radiation due to one-way and two-way ground clutter.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

DISCLOSURE OF INVENTION

An improved radar range is provided comprising a ground plane, support means for supporting a target a selected height above the ground plane, transmitting means for directing for a selected period of time an electromagnetic wave at the target, means for increasing the time required for the portion of the electromagnetic wave reflected off the target toward the ground plane to return to the target, and receiving means for receiving for a selected period of time the portion of the electromagnetic wave that is backscattered by the target. In a particular embodiment, the means for increasing the return time includes means for recessing the support means a selected distance below the ground plane by providing a diffraction ridge a selected distance from the support means toward the transmitting means with the ridge sloping down to the selected distance below the ground plane.

BEST MODE FOR CARRYING OUT THE INVENTION

Figure 1:
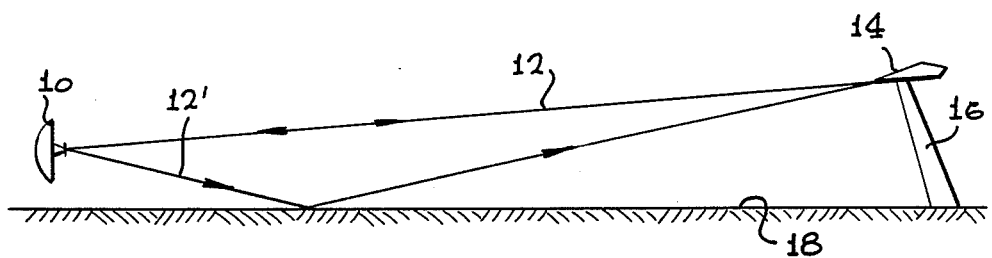
FIG. 1 is a diagrammatic representation of a ground plane range used in the prior art.

Referring now to FIG. 1, a diagrammatic representation of a ground plane range used in the prior art is illustrated. The range includes an antenna 10 which transmits an electromagnetic wave 12, such as a radar beam, toward a target 14 mounted on a pylon 16. A portion 12' of the wave 12 is reflected off the ground plane 18 and combines at the target 14 with the direct wave 12. The angle of the antenna 10 is adjusted such that the magnitude of the direct wave 12 and the reflected wave 12' are substantially equal. The waves 12, 12' add in phase at the target 14 so that a wave of uniform amplitude in the vertical plane exists in the region of the target 14, while such amplitude drops off to near zero above and below the region of the target 14.

Figure 2:
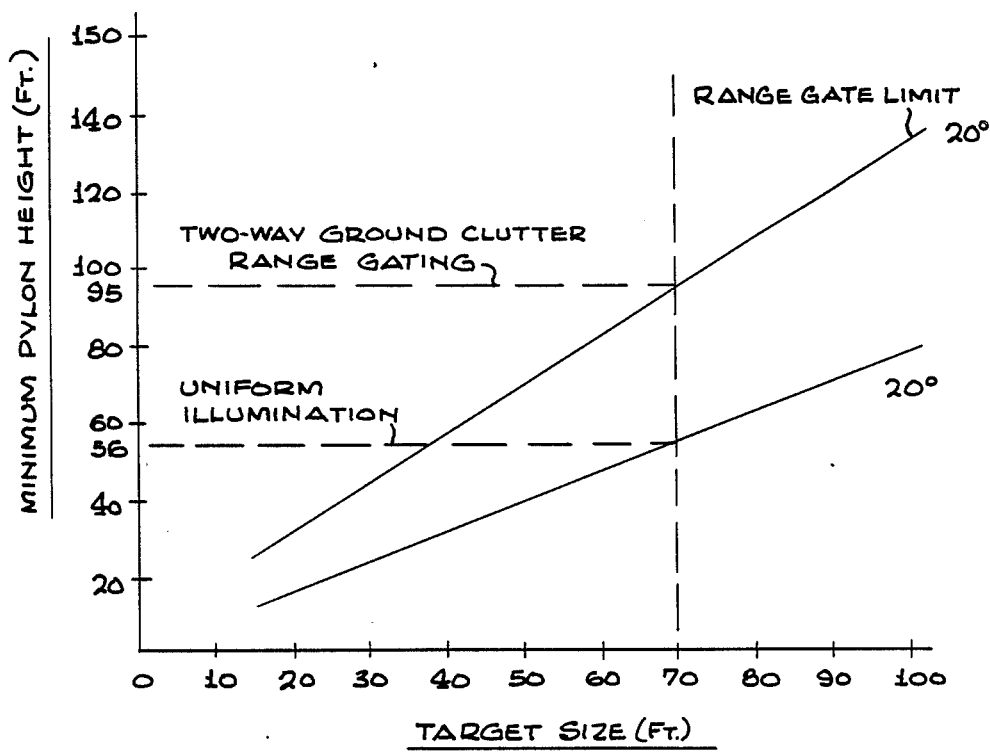
FIG. 2 graphically illustrates the positional requirements for successful measurement of the radar cross-section of a target.

In operation, the ground plane range utilizes a standard pulsed radar beam transmitted by the antenna 10 to illuminate the target 14 for a selected period of time and a standard time or "range gated" receiver (not shown) coupled to the antenna 10 to measure for a selected period of time the electromagnetic wave backscattered from the target 14 to antenna 10. The backscattered wave also contains an energy component that arises from energy scattered from the target 14 to the ground plane 18 and back to the target 14 where it is reflected back to the antenna 10. This undesirable backscatter can be range gated out by the receiver coupled to antenna 10 if the undesirable backscatter arrives late enough at the antenna 10 compared to the electromagnetic energy directly backscattered or reflected by the target 14. As is shown in FIG. 2, the height of the pylon 16 should be 95 ft. above the ground plane 18 to allow range gating of such undesirable backscatter (two-way ground clutter) for a target 14 having a size of 70 ft. and a 20° angle of presentation to the waves 12, 12′. At the same time, as shown in FIG. 2, it is desirable to mount the target 14 on a pylon 16 that is 56 ft. above the ground plane 18 to place the target 14 in a region of uniform amplitude or illumination in the vertical plane for a range of 10,000 ft. and a 4 ft. diameter antenna 10 operating at 15 GHz with the center of the antenna 10 being 2 ft. above the ground plane 18. As stated previously, if the target 14 is raised from 56 ft. to 95 ft. to allow range gating, the antenna 10 must be lowered below the ground plane 18 and/or made smaller, thereby reducing the power on the target 14.

Figure 3:
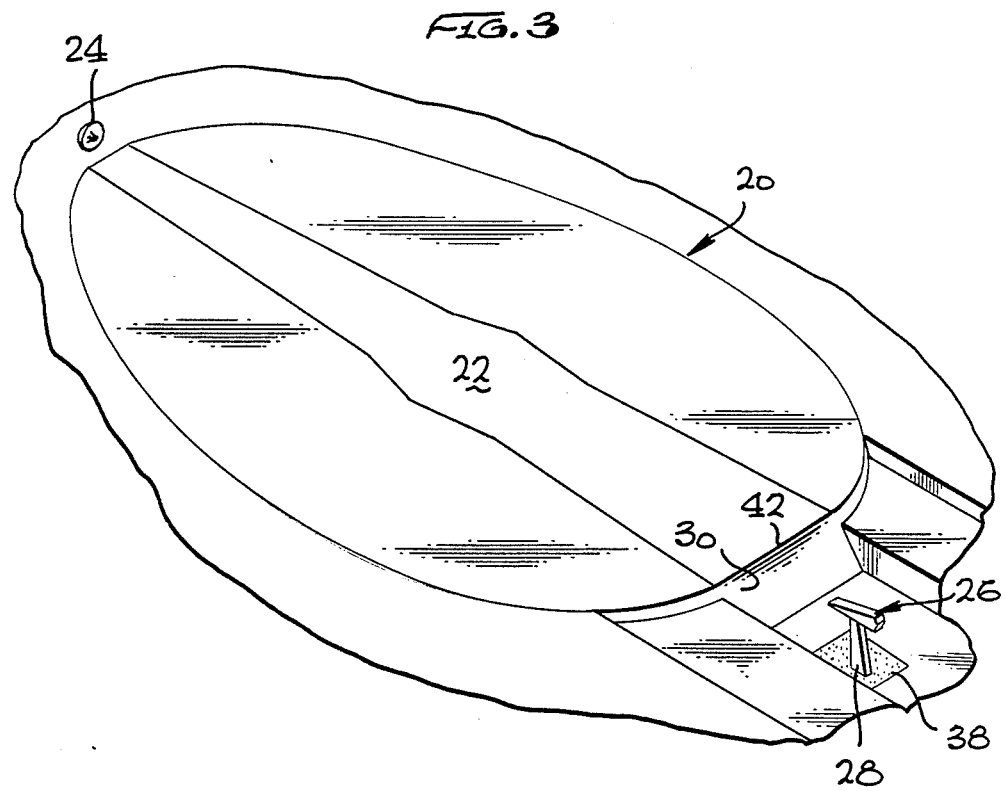
FIG. 3 is an isometric view of the radar range of the present invention.
Figure 4:
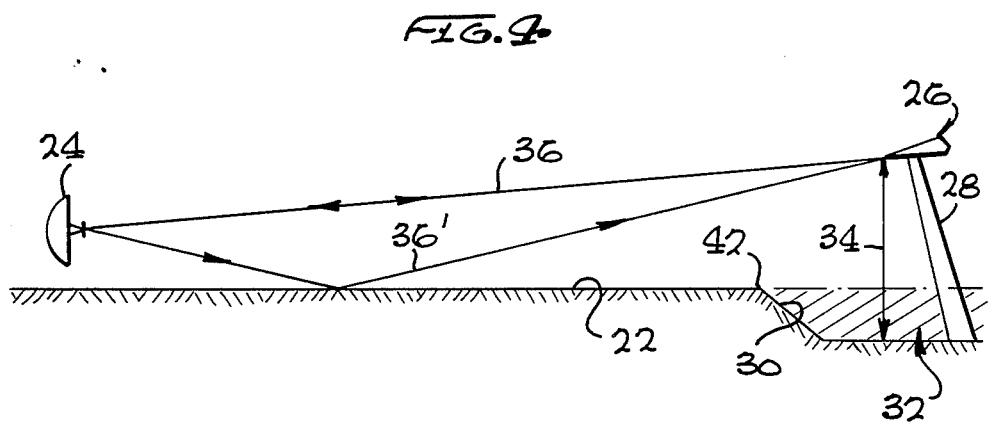
FIG. 4 is a diagrammatic representation of the radar range of the, present invention.
Figure 5:
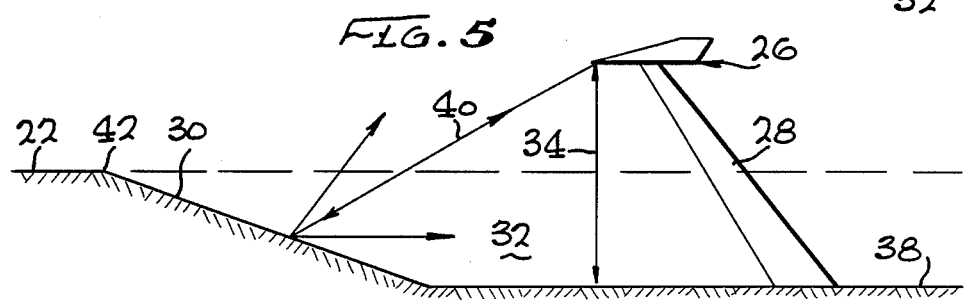
FIG. 5 is a diagrammatic view of the shadow region of the present invention.

These conflicting requirements are overcome by the implementation of the present invention illustrated in FIGS. 3-5. In FIGS. 3-5, a radar range 20 is shown having a ground plane 22 and an antenna 24. A target 26 is mounted on a pylon 28. The ground plane 22 has a diffraction or shadow ridge 30 which slopes downward starting approximately 235 ft. in front of the pylon 28 to reach a depth of 39 ft. below the ground plane 22 approximately 150 ft. in front of the target 26, thus forming a shadow region 32. Thus, a 95 ft. pylon 28 would extend only 56 ft. above the ground plane 22 and would place the target 26 in a region of uniform illumination. On the other hand, a scattered wave 34 would have to travel 95 ft. to the region 38 at the base of the pylon 28 in order to be scattered back to the target 26 and would take a sufficiently long time in so doing that it would be range gated out by the receiver. In addition, the region 38 below the target 26 could be covered with a radar absorbing material to absorb radiation scattered down toward the ground plane 22 from the target 26. Because of the diffraction ridge 30, the electromagnetic wave 36, 36′ from the antenna 24 does not see the shadow region 32 and thus the wave 36, 36′ sees only a 56 ft. pylon 28 instead of a 95 ft. pylon 28, reducing the pylon high frequency surface roughness clutter and the finishing cost of the pylon 28 to high frequency standards. One-way ground clutter, i.e., radiation 40 scattered from the target 26 to the ground plane 22 to the antenna 24, is also reduced by the presence of the diffraction ridge 30 which causes a portion of such one-way ground clutter to be reflected back toward the target 26 and subsequently range gated out by the receiver due to the time delay and a portion of such one-way ground clutter to be merely reflected away from the antenna 24.

In order to further reduce unwanted terrain backscatter, the diffraction ridge 30 may be extended an additional 300 ft. out to 600 ft. either side of the pylon 28 at a reduced dropoff of between 8–10 ft. While the lip 42 of the diffraction ridge 30 is generally oriented orthogonal to the direction of the wave 36, in order to reduce backscatter from the lip 42 of the diffraction ridge 30, the lip 42 could be oriented, where necessary, non-orthogonally to the direction of the wave 36. The angle of the slope of the diffraction ridge 30 depends, in general, on the lowest radar frequency used and would be approximately 15° for a frequency of 150 MHz to assure sufficient shadowing.

Having described the invention, it is obvious that numerous modifications and variations may be made by those skilled in the art. Thus, the invention is to be construed as being limited only by the spirit and scope of the appended claims.

INDUSTRIAL APPLICABILITY

The improved radar range is useful in more accurately measuring the radar cross-section of a target.

I claim:

1. An improved radar range comprising
a ground plane;
support means for supporting a target a selected height above said ground plane;
transmitting means for directing for a selected period of time an electromagnetic wave at said target;
means for increasing the time required for the portion of said electromagnetic wave scattered off said target toward said ground plane to return to said target; and
receiving means for receiving for a selected period of time the portion of said electromagnetic wave that is backscattered by said target.

2. An improved radar range comprising
a ground plane;
support means for supporting a target a selected height above said ground plane;
transmitting means for directing for a selected period of time an electromagnetic wave at said target;
receiving means for receiving for a selected period of time the portion of said electromagnetic wave that is backscattered by said target; and
means for causing a portion of said electromagnetic wave scattered off said target toward said ground plane and said receiving means to return to said target after a selected period of time.

3. An improved radar range comprising
a ground plane;
support means for supporting a target a selected height above said ground plane;
transmitting means for directing an electromagnetic wave at said target;
receiving means for receiving the portion of said electromagnetic wave that is backscattered by said target; and
means for diffracting a portion of said electromagnetic wave directed at said target and said support means for preventing undesirable scatter from said target and said support means from reaching said receiving means comprising a diffraction ridge a selected distance from said support means towards said transmitting means, said ridge sloping down a selected distance below said ground plane.

4. The radar range of claim 3 wherein the base of said support means is disposed said selected distance below said ground plane.

5. An improved radar range comprising
a ground plane;
support means for supporting a target a selected height above said ground plane;
transmitting means for directing for a selecting period of time an electromagnetic wave at said target;

receiving means for receiving for a selected period of time the portion of said electromagnetic wave that is backscattered by said target; and means for causing a portion of said electromagnetic wave scattered off said target toward said ground plane and said receiving means to return to said target after a selected period of time comprising a diffraction ridge a selected distance from said support means towards said transmitting means, said ridge sloping down a selected distance from said ground plane.

6. The radar range of claim 5 wherein the base of said support means is disposed said selected distance below said ground plane.

7. An improved radar range comprising a ground plane;

support means for supporting a target a selected height above said ground plane;

transmitting means for directing for a selected period of time an electromagnetic wave at said target;

means for increasing the time required for the portion of said electromagnetic wave scattered off said target toward said ground plane to return to said target comprising means for recessing said support means a selected distance below said ground plane; and receiving means for receiving for a selected period of time the portion of said electromagnetic wave that is backscattered by said target.

8. The radar range of claim 7 wherein said means for recessing said support means includes a diffraction ridge a selected distance from said support means toward said transmitting means, said ridge sloping down to said selected distance below said ground plane.

9. The radar range of claim 8 wherein the lip of said diffraction ridge is spacially oriented so as to be orthogonal to the direction of propagation of said electromagnetic wave.

10. The radar range of claim 8 wherein at least a portion of the lip of said diffraction ridge is spacially oriented so as to be non-orthogonal to the direction of propagation of said electromagnetic wave.

11. The radar range of claim 8 further including energy absorbing means positioned below said target to absorb said electromagnetic wave reflected off said target toward said ground plane.

12. The radar range of claim 8 wherein said diffraction ridge extends a selected distance on either side of said support means and slopes down a second selected distance below said ground plane.

* * * * *